United States Patent
Yokota et al.

(10) Patent No.: US 11,841,942 B2
(45) Date of Patent: Dec. 12, 2023

(54) ANOMALY DETECTION DEVICE AND ANOMALY DETECTION METHOD

(71) Applicant: Panasonic Intellectual Property Management Co., Ltd., Osaka (JP)

(72) Inventors: Kaoru Yokota, Hyogo (JP); Takayuki Fujii, Osaka (JP); Toshihisa Nakano, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 18/126,651

(22) Filed: Mar. 27, 2023

(65) Prior Publication Data

US 2023/0229762 A1    Jul. 20, 2023

Related U.S. Application Data

(63) Continuation of application No. PCT/JP2021/027124, filed on Jul. 20, 2021.

(30) Foreign Application Priority Data

Oct. 22, 2020 (JP) ................. 2020-177337

(51) Int. Cl.
    *G06F 21/55* (2013.01)
(52) U.S. Cl.
    CPC .......... *G06F 21/552* (2013.01); *G06F 21/554* (2013.01)
(58) Field of Classification Search
    CPC ................... G06F 21/552; G06F 21/554
    See application file for complete search history.

(56) References Cited

U.S. PATENT DOCUMENTS

| 9,930,064 | B1* | 3/2018 | Sherwell ............. H04L 63/1433 |
| 11,341,235 | B2* | 5/2022 | Jaenisch ................. G06F 21/54 |
| 2011/0078515 | A1 | 3/2011 | Yasukawa |
| 2015/0195297 | A1 | 7/2015 | Ben Noon et al. |

(Continued)

FOREIGN PATENT DOCUMENTS

| JP | 2011-070505 | 4/2011 |
| JP | 2016-057773 | 4/2016 |

(Continued)

OTHER PUBLICATIONS

Office Action from Japan Patent Office (JPO) in Japanese Patent Appl. No. 2022-556411, dated Mar. 7, 2023, together with an English language translation.

(Continued)

*Primary Examiner* — Christopher A Revak
(74) *Attorney, Agent, or Firm* — Greenblum & Bernstein, P.L.C.

(57) ABSTRACT

An anomaly detection device is a device for detecting an anomaly in a mobile body and includes: a type determiner that determines a type of an anomaly detected; a type change determiner that determines whether or not a change has occurred between a type of an anomaly detected last time and a type of an anomaly detected this time; and an anomaly detection log transmitter that transmits an anomaly detection log related to the anomaly detected this time when the change has occurred, and does not transmit the anomaly detection log related to the anomaly detected this time when the change has not occurred.

8 Claims, 8 Drawing Sheets

(56) References Cited

U.S. PATENT DOCUMENTS

| | | | |
|---|---|---|---|
| 2017/0251063 A1* | 8/2017 | Tang | H04L 67/01 |
| 2019/0217869 A1 | 7/2019 | Takeuchi et al. | |
| 2021/0006484 A1* | 1/2021 | Fan | G06F 11/0757 |
| 2021/0374027 A1* | 12/2021 | Joglekar | G06F 11/076 |
| 2023/0004654 A1* | 1/2023 | Jurzak | G06N 20/20 |

FOREIGN PATENT DOCUMENTS

| | | |
|---|---|---|
| JP | 6382724 | 8/2018 |
| JP | 2019-120433 | 7/2019 |
| JP | 2019-125867 | 7/2019 |

OTHER PUBLICATIONS

International Search Report (ISR) from International Searching Authority (Japan Patent Office) in International Pat. Appl. No. PCT/JP2021/027124, dated Oct. 12, 2021, together with an English language translation.

Written Opinion (WO) from International Searching Authority (Japan Patent Office) in International Pat. Appl. No. PCT/JP2021/027124, dated Oct. 12, 2021, together with an English language translation.

\* cited by examiner

ANOMALY DETECTION DEVICE AND ANOMALY DETECTION METHOD

CROSS REFERENCE TO RELATED APPLICATIONS

This is a continuation application of PCT International Application No. PCT/JP2021/027124 filed on Jul. 20, 2021, designating the United States of America, which is based on and claims priority of Japanese Patent Application No. 2020-177337 filed on Oct. 22, 2020.

FIELD

The present disclosure relates to an anomaly detection device and an anomaly detection method.

BACKGROUND

Patent Literature (PTL) 1 discloses an automobile safety system including a cyber watchman installed inside each of a plurality of vehicles and a cyber hub installed outside the vehicles. The cyber watchman is connected to an in-vehicle communication network and obtains communication traffic data on the in-vehicle communication network. The cyber hub receives the communication traffic data obtained by the cyber watchman from the cyber watchman via a communication network such as the Internet. Thus, the cyber hub can aggregate communication traffic data from the plurality of vehicles and obtain high-order information about cyberattacks on the vehicles.

CITATION LIST

Patent Literature

PTL 1: Japanese Patent No. 6382724

SUMMARY

However, the system disclosed in PTL 1 above can be improved upon.

Therefore, the present disclosure provides an anomaly detection device and the like that can improve upon the above related art.

An anomaly detection device according to one aspect of the present disclosure is an anomaly detection device for detecting an anomaly in a mobile body and includes: a type determiner that determines a type of an anomaly detected; a type change determiner that determines whether or not a change has occurred between a type of an anomaly detected last time and a type of an anomaly detected this time; and an anomaly detection log transmitter that transmits an anomaly detection log related to the anomaly detected this time when the change has occurred, and does not transmit the anomaly detection log related to the anomaly detected this time when the change has not occurred.

Further, an anomaly detection method according to one aspect of the present disclosure is an anomaly detection method for detecting an anomaly in a mobile body and includes: determining a type of an anomaly detected; determining whether or not a change has occurred between a type of an anomaly detected last time and a type of an anomaly detected this time; and transmitting an anomaly detection log related to the anomaly detected this time when the change has occurred, and not transmitting the anomaly detection log related to the anomaly detected this time when the change has not occurred.

The anomaly detection device and the like according to one aspect of the present disclosure can improve upon the above related art.

DESCRIPTION OF EMBODIMENTS

Embodiment

With the system disclosed in PTL 1 above, the cyber hub receives a substantial amount of data from the cyber watchman, which may result in a substantial amount of communication data.

In view of this, an anomaly detection device and the like that can reduce the amount of communication data will be described below.

Hereinafter, an anomaly detection device according to an embodiment will be described with reference to the drawings.

[Configuration of Anomaly Detection System]

First, an anomaly detection system, to which the anomaly detection device according to the embodiment has been applied, will be described with reference to FIG. 1.

Figure 1:
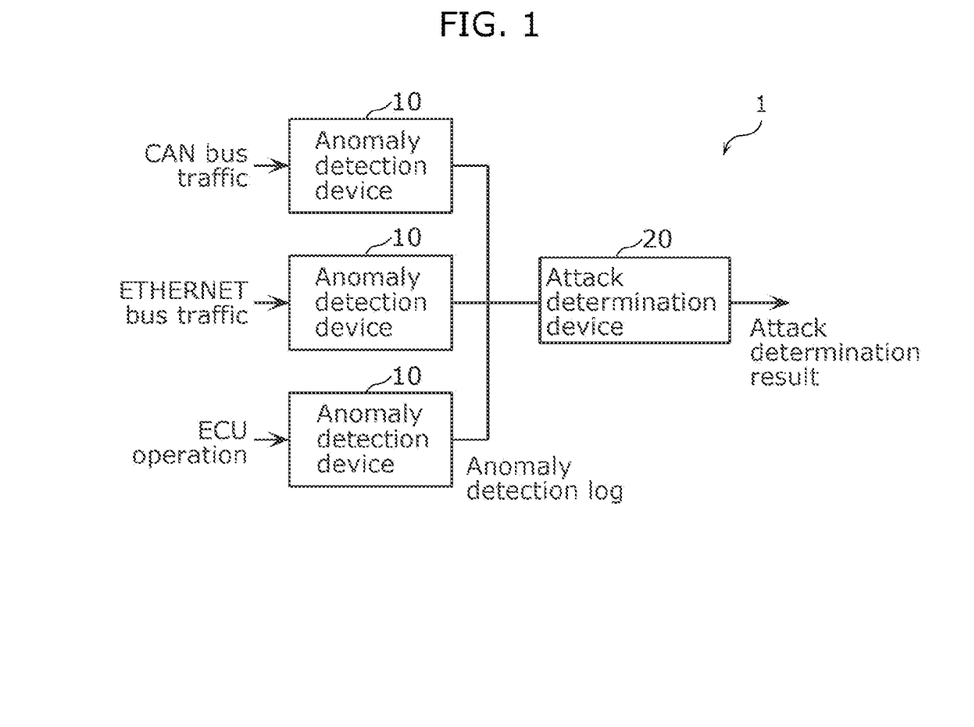
FIG. 1 is a configuration diagram illustrating an example of an anomaly detection system according to an embodiment.

FIG. 1 is a configuration diagram illustrating an example of anomaly detection system 1 according to the embodiment.

Anomaly detection system 1 is a system that includes a plurality of anomaly detection devices 10 and attack determination device 20 and makes a determination on an attack on a mobile body.

Anomaly detection device 10 is a device for detecting anomalies in a network and a device in a mobile body that occur when the network and the device in the mobile body are attacked. For example, the network is an in-vehicle network in an automobile, and anomaly detection device 10 is mounted in the automobile and detects an anomaly in the communication of the in-vehicle network. The device is, for example, an electronic control unit (ECU) in an automobile, and anomaly detection device 10 is connected or incorporated to the device and detects an anomaly in the operation of the device. For example, of the plurality of anomaly detection devices 10, one anomaly detection device 10 detects an anomaly in Control Area Network (CAN) bus traffic, one anomaly detection device 10 detects an anomaly in Ethernet (registered trademark) bus traffic, and one anomaly detection device 10 detects an anomaly in the operation of the ECU to which that anomaly detection device 10 is connected or incorporated. When detecting an anomaly, anomaly detection device 10 generates an anomaly detection log related to the anomaly from the result of the anomaly detection. The anomaly detection log includes the type of the anomaly detected, information of anomaly detection device 10 having detected the anomaly (identification information and the like), a detection time at which the anomaly was detected, and the like. Anomaly detection device 10 transmits the generated anomaly detection log to attack determination device 20.

Attack determination device 20 is a device that aggregates anomaly detection logs transmitted from the plurality of anomaly detection devices 10. Attack determination device 20 uses the aggregated anomaly detection log to make a determination on an attack on the network.

In the present disclosure, anomaly detection device 10 does not transmit all the generated anomaly detection logs to attack determination device 20. This is because when all the generated anomaly detection logs are transmitted, a problem described in the following comparative example occurs.

Comparative Example

Figure 2:
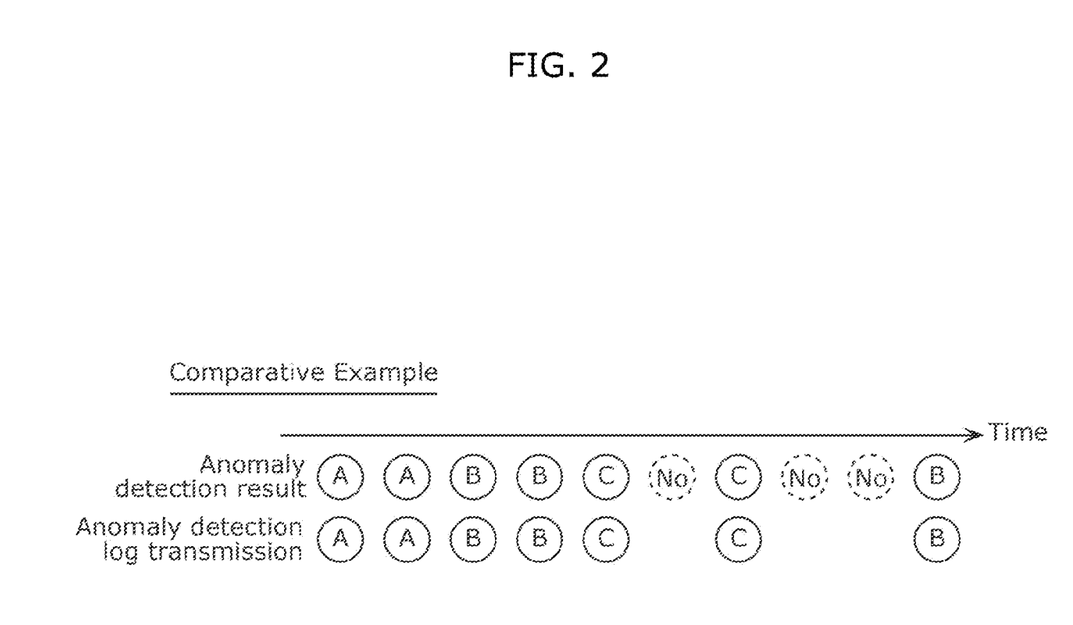
FIG. 2 is a diagram for explaining the transmission timing for anomaly detection logs in a comparative example.

FIG. 2 is a diagram for explaining the transmission timing for anomaly detection logs in a comparative example. In FIG. 2, the horizontal axis indicates time, circled "A", "B", and "C" in the row of "Anomaly detection result" indicate that the anomalies of types A, B, and C were detected, and circled "A", "B", and "C" in the row of "Anomaly detection log transmission" indicate that anomaly detection logs related to the anomalies of types A, B, and C were transmitted.

As illustrated in FIG. 2, it can be seen that in the comparative example, an anomaly detection log is generated each time an anomaly is detected, and the anomaly detection log is transmitted each time. In the comparative example, each time an anomaly is detected, an anomaly detection log is transmitted from each anomaly detection device to attack determination device 20, resulting in a substantial number of anomaly detection logs and thus a substantial amount of communication data. In contrast, according to anomaly detection device 10 of the present disclosure, the amount of communication data can be reduced. Anomaly detection device 10 capable of reducing the amount of communication data will be described below.

[Configuration of Anomaly Detection Device]

Figure 3:
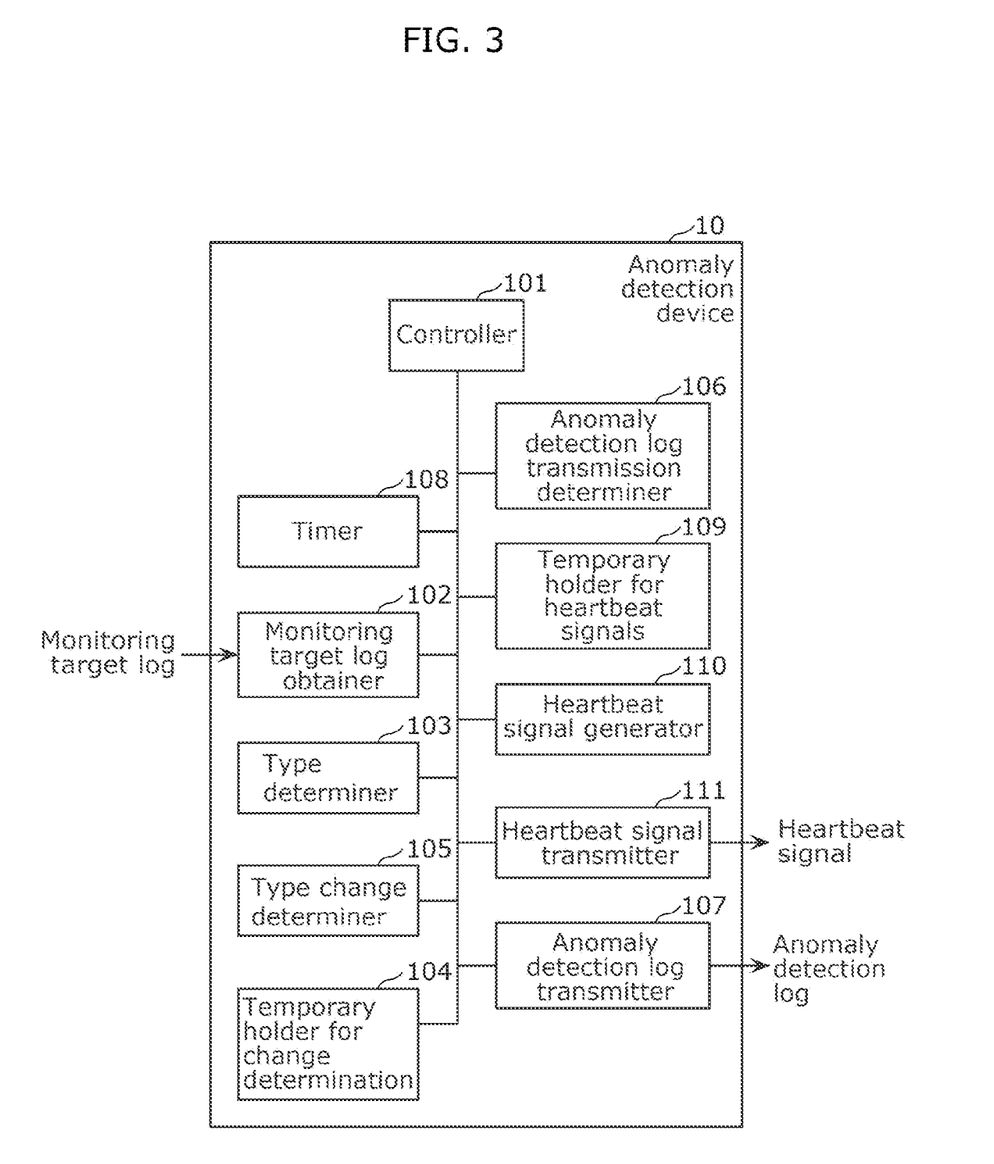
FIG. 3 is a configuration diagram illustrating an example of an anomaly detection device according to the embodiment.

FIG. 3 is a configuration diagram illustrating an example of anomaly detection device 10 according to the embodiment.

Anomaly detection device 10 is a computer for detecting an anomaly in a mobile body (here, an automobile). For example, anomaly detection device 10 is mounted on an automobile or an ECU in an automobile and monitors CAN bus traffic, Ethernet bus traffic, or the operation of the ECU. By such monitoring, anomaly detection device 10 detects an anomaly and transmits an anomaly detection log to attack determination device 20. Anomaly detection device 10 has a function of transmitting a heartbeat signal to attack determination device 20 for device health monitoring.

Anomaly detection device 10 includes a processor, a memory, a communication interface, and the like. The memory includes read-only memory (ROM), random-access memory (RAM), and the like, and can store a program to be executed by the processor. Anomaly detection device 10 includes controller 101, monitoring target log obtainer 102, type determiner 103, temporary holder 104 for change determination, type change determiner 105, anomaly detection log transmission determiner 106, anomaly detection log transmitter 107, timer 108, temporary holder 109 for heartbeat signals, heartbeat signal generator 110, and heartbeat signal transmitter 111. Controller 101, type determiner 103, type change determiner 105, anomaly detection log transmission determiner 106, timer 108, and heartbeat signal generator 110 are achieved by the processor or the like that executes the program stored in the memory. Monitoring target log obtainer 102, anomaly detection log transmitter 107, and heartbeat signal transmitter 111 are achieved by the communication interface. Temporary holder 104 for change determination and temporary holder 109 for heartbeat signals are achieved by the memory. The memory in which the program is stored, temporary holder 104 for change determination, and temporary holder 109 for heartbeat signals may be separate memories or may be one memory. Note that anomaly detection device 10 may be a server communicatively connected to an automobile or the like. The components constituting anomaly detection device 10 may be distributed in a plurality of servers, and anomaly detection device 10 may be an anomaly detection system.

Controller 101 controls monitoring target log obtainer 102, type determiner 103, temporary holder 104 for change determination, type change determiner 105, anomaly detection log transmission determiner 106, anomaly detection log transmitter 107, timer 108, temporary holder 109 for heartbeat signals, heartbeat signal generator 110, and heartbeat signal transmitter 111.

Monitoring target log obtainer 102 obtains a log of a monitoring target. When the monitoring target of anomaly detection device 10 is CAN bus traffic, monitoring target log obtainer 102 obtains a log of a message flowing through the CAN bus. When the monitoring target of anomaly detection device 10 is Ethernet bus traffic, monitoring target log obtainer 102 obtains a log of a message flowing through the Ethernet bus. When the monitoring target of anomaly detection device 10 is the operation of the ECU, monitoring target log obtainer 102 obtains an operation log of the ECU.

Type determiner 103 detects an anomaly in the monitoring target based on the log of the monitoring target obtained by monitoring target log obtainer 102 and determines the type of the anomaly detected. As the type of the anomaly, type determiner 103 determines such types as follows: an anomaly in the amount of network communication, an anomaly in a message flowing through the network (for example, an anomaly in message identification (ID) included in a message), and an anomaly in the operation of the device (for example, unauthorized reading/writing from/to data or files, or a device authentication error).

Temporary holder 104 for change determination temporarily holds the type of the anomaly determined by type determiner 103.

Type change determiner 105 determines whether or not a change has occurred between the type of the anomaly detected last time and the type of the anomaly detected this time. Specifically, type change determiner 105 compares the type of the anomaly detected last time held in temporary holder 104 for change determination with the type of the anomaly detected this time, and determines whether or not there is a change in the type of the anomaly. After the determination, the type of the anomaly detected last time held in temporary holder 104 for change determination is erased.

When there is no change between the type of the anomaly detected last time and the type of the anomaly detected this time, anomaly detection log transmission determiner 106 determines not to transmit an anomaly detection log related to the anomaly detected this time. Thus, anomaly detection log transmitter 107 does not transmit the anomaly detection log related to the anomaly detected this time. When there is a change between the type of the anomaly detected last time and the type of the anomaly detected this time, anomaly detection log transmission determiner 106 determines to transmit an anomaly detection log related to the anomaly detected this time. Thus, anomaly detection log transmitter 107 transmits the anomaly detection log related to the anomaly detected this time.

Timer 108 is a timer for anomaly detection device 10 to periodically transmit a heartbeat signal, and a heartbeat signal is transmitted when timer 108 times out after a certain period of time. When a heartbeat signal is transmitted, timer 108 is reset, and when timer 108 times out again after a certain period of time, a heartbeat signal is transmitted. By repeating this process, a heartbeat signal can be transmitted periodically.

Temporary holder 109 for heartbeat signals is an example of a holder for holding an anomaly detection result. The anomaly detection result held by temporary holder 109 for heartbeat signals includes information indicating the detection of an anomaly during a predetermined period until the transmission of a heartbeat signal. Alternatively, the anomaly detection result held by temporary holder 109 for heartbeat signals includes the type of an anomaly detected during a predetermined period until the transmission of a heartbeat signal. Note that the anomaly detection result held by temporary holder 109 for heartbeat signals may include both information indicating the detection of the anomaly during the predetermined period and the type of the anomaly detected during the predetermined period. The anomaly detection result held in temporary holder 109 for heartbeat signals is erased at the time of transmission of the heartbeat signal. The predetermined period is, for example, a period from the transmission of the heartbeat signal last time to the transmission of the heartbeat signal this time (in other words, a heartbeat cycle). That is, an anomaly detection result in the heartbeat cycle immediately before the transmission of the heartbeat signal this time is temporarily held in temporary holder 109 for heartbeat signals, and when the heartbeat signal is transmitted this time, the anomaly detection result in the heartbeat cycle immediately before the transmission of the heartbeat signal this time, which is held in temporary holder 109 for heartbeat signals, is erased.

Heartbeat signal generator 110 generates a heartbeat signal when timer 108 times out.

Heartbeat signal transmitter 111 periodically transmits a heartbeat signal. Specifically, heartbeat signal transmitter 111 transmits a heartbeat signal generated by heartbeat signal generator 110 each time timer 108 times out.

When an anomaly is detected during a predetermined period until the transmission of a heartbeat signal, heartbeat signal generator 110 generates a heartbeat signal containing information that indicates the detection of the anomaly and that is included in the anomaly detection result held in temporary holder 109 for heartbeat signals. Thereby, heartbeat signal transmitter 111 transmits the heartbeat signal containing information that indicates the detection of the anomaly and that is included in the anomaly detection result held in temporary holder 109 for heartbeat signals. Alternatively, when an anomaly is detected during a predetermined period until the transmission of a heartbeat signal, heartbeat signal generator 110 generates a heartbeat signal containing the type of the anomaly included in the anomaly detection result held in temporary holder 109 for heartbeat signals. Thereby, heartbeat signal transmitter 111 transmits the heartbeat signal containing the type of the anomaly included in the anomaly detection result held in temporary holder 109 for heartbeat signals.

[Example of Operation of Anomaly Detection Device]

Next, an example of the operation of anomaly detection device 10 will be described with reference to FIG. 4.

Figure 4:
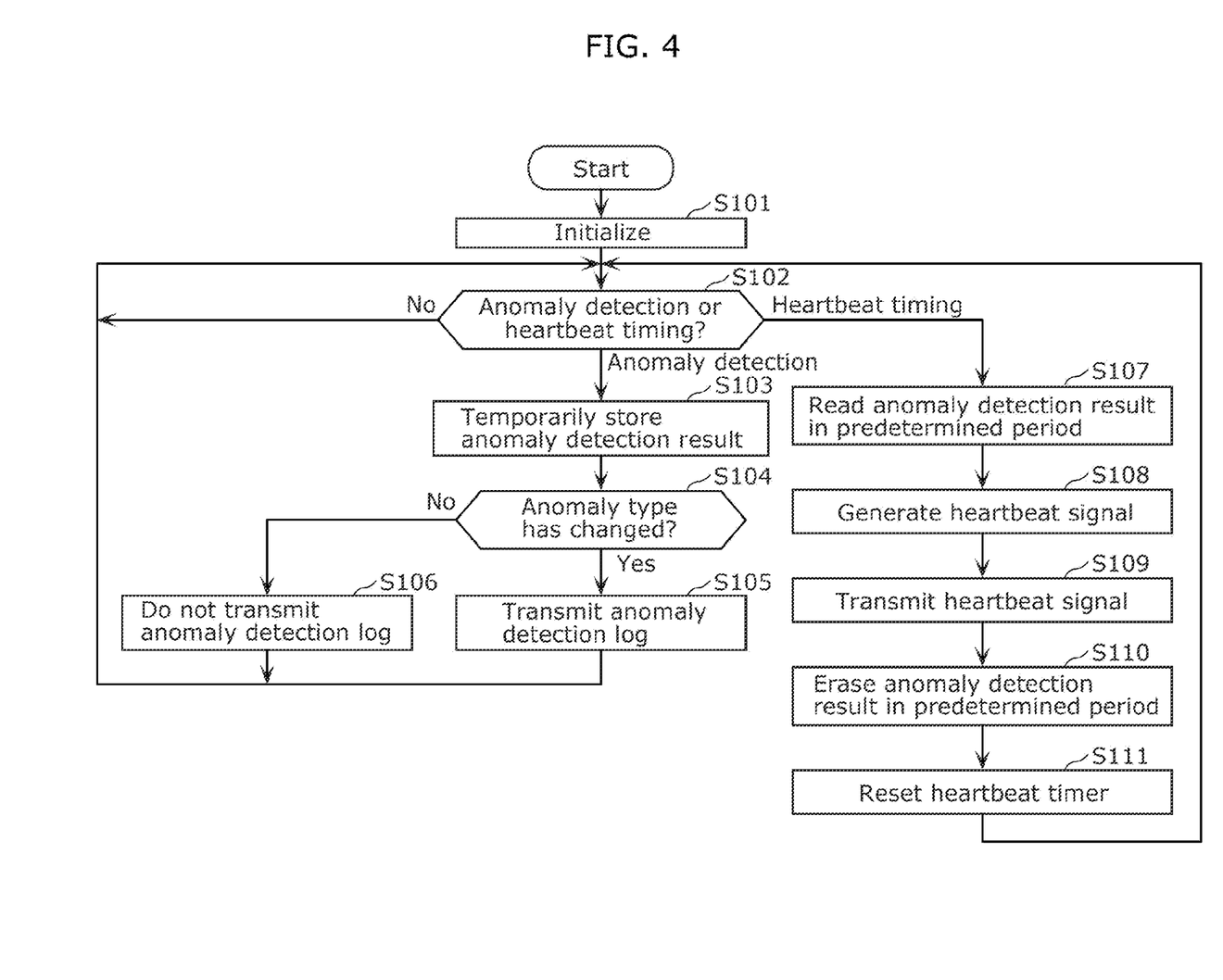
FIG. 4 is a flowchart illustrating an example of the operation of the anomaly detection device according to the embodiment.

FIG. 4 is a flowchart illustrating an example of the operation of anomaly detection device 10 according to the embodiment.

First, anomaly detection device 10 initializes (resets) temporary holder 104 for change determination, temporary holder 109 for heartbeat signals, and timer 108 (step S101).

Next, anomaly detection device 10 determines whether or not an anomaly has been detected and whether or not it is the transmission timing for a heartbeat signal (step S102). When type determiner 103 has detected an anomaly, anomaly detection device 10 determines that an anomaly has been detected. When timer 108 times out, anomaly detection device 10 determines that it is the transmission timing for a heartbeat signal.

When no anomaly has been detected or when it is not the transmission timing for a heartbeat signal (No in step S102), anomaly detection device 10 repeats the process in step S102 until an anomaly is detected or the transmission timing for a heartbeat signal is reached.

When anomaly detection device 10 (type determiner 103) detects an anomaly ("Detect anomaly" in step S102), an anomaly detection result is temporarily stored in temporary holder 104 for change determination (step S103). The anomaly detection result held in temporary holder 104 for change determination includes the type of the anomaly detected.

Next, anomaly detection device 10 (type change determiner 105) determines whether or not a change has occurred between the type of the anomaly detected last time and the type of the anomaly detected this time (step S104). Specifically, anomaly detection device 10 compares the type of the anomaly included in the anomaly detection result of the anomaly detected last time held in temporary holder 104 for change determination with the type of the anomaly included in the anomaly detection result of the anomaly detected this time held in temporary holder 104 for change determination, and determines whether or not the type of the anomaly has changed between the last time and this time.

When there is a change between the type of the anomaly detected last time and the type of the anomaly detected this time (Yes in step S104), anomaly detection device 10 (anomaly detection log transmitter 107) transmits an anomaly detection log related to the anomaly detected this time (step S105).

On the other hand, when there is no change between the type of the anomaly detected last time and the type of the anomaly detected this time (No in step S104), anomaly detection device 10 (anomaly detection log transmitter 107) does not transmit the anomaly detection log related to the anomaly detected this time (step S106).

As thus described, not all the anomaly detection logs related to the detected anomalies are transmitted, but only when there is a change between the type of the anomaly detected last time and the type of the anomaly detected this time, an anomaly detection log related to the anomaly detected this time is transmitted.

Next, when the transmission timing for a heartbeat signal is reached ("Heartbeat timing" in step S102), anomaly detection device 10 reads an anomaly detection result in a predetermined period (step S107). Temporary holder 109 for heartbeat signals holds an anomaly detection result including information that indicates the detection of the anomaly during the predetermined period or an anomaly detection result including the type of the anomaly detected during the predetermined period. Therefore, anomaly detection device 10 can read the anomaly detection result in the predetermined period from temporary holder 109 for heartbeat signals.

Next, anomaly detection device 10 (heartbeat signal generator 110) generates a heartbeat signal (step S108). When an anomaly is detected during the predetermined period, anomaly detection device 10 generates a heartbeat signal containing information that indicates the detection of the anomaly or the type of the anomaly, which is included in the anomaly detection result held in temporary holder 109 for heartbeat signals.

Then, anomaly detection device 10 (heartbeat signal transmitter 111) transmits the generated heartbeat signal (step S109).

Next, when an anomaly is detected during the predetermined period and the anomaly detection result is held in temporary holder 109 for heartbeat signals, anomaly detection device 10 erases the anomaly detection result in the predetermined period from temporary holder 109 for heartbeat signals (step S110).

Then, anomaly detection device 10 resets timer 108 configured to periodically transmit a heartbeat signal (step S111). Thus, anomaly detection device 10 can transmit a heartbeat signal when the next transmission timing for the heartbeat signal is reached.

As described above, when an anomaly is detected during a predetermined period until the transmission of a heartbeat signal, a heartbeat signal containing information that indicates the detection of the anomaly during the predetermined period or containing the type of the anomaly detected during the predetermined period is transmitted.

Next, the transmission timing for anomaly detection logs and heartbeat signals will be specifically described with reference to FIG. 5.

Figure 5:
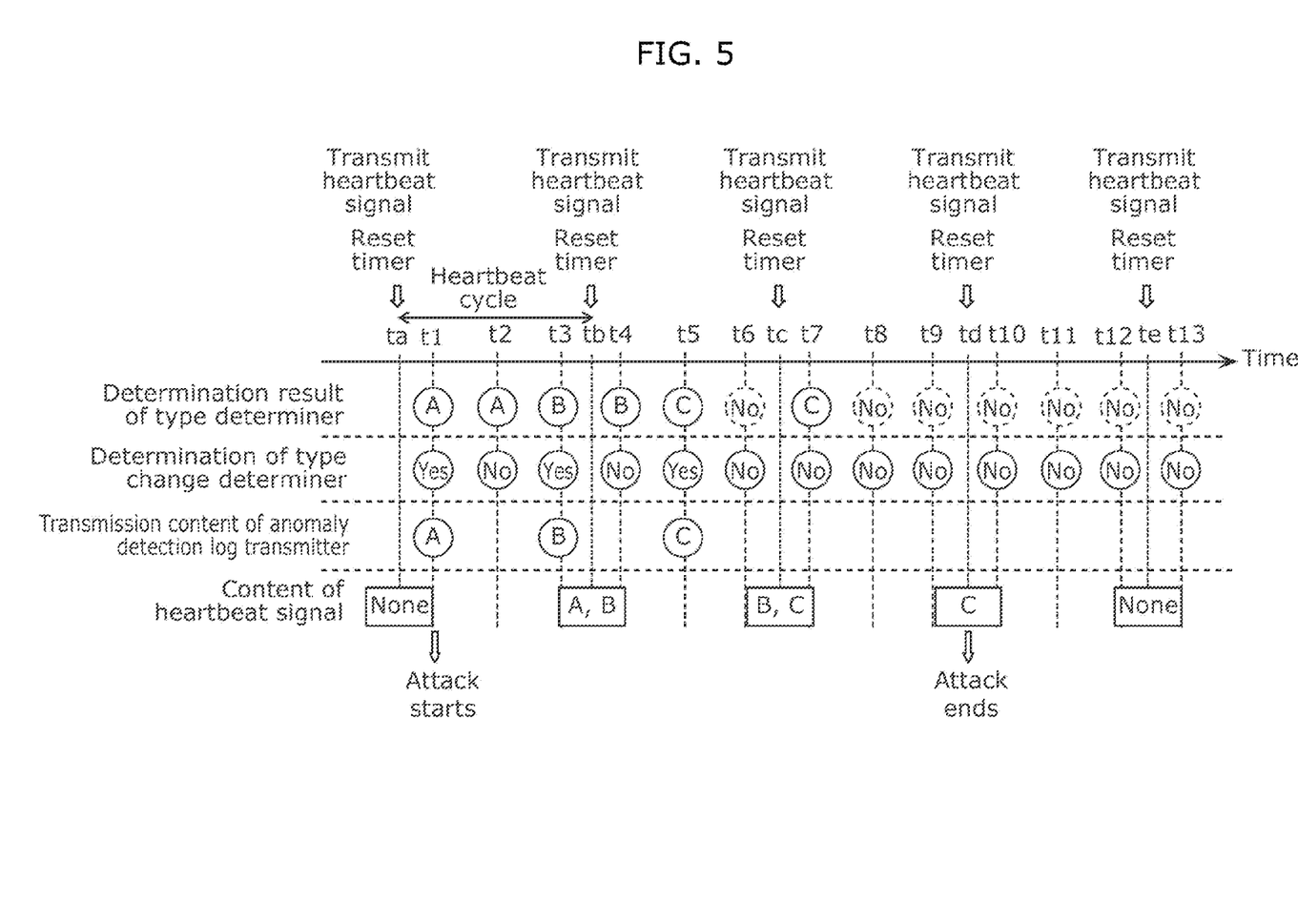
FIG. 5 is a timing chart illustrating an example of the transmission timing for anomaly detection logs and heartbeat signals in the embodiment.

FIG. 5 is a timing chart illustrating an example of the transmission timing for anomaly detection logs and heartbeat signals in the embodiment. Here, a description will be given of an example in which a heartbeat signal containing the type of an anomaly detected during a predetermined period is transmitted.

As illustrated in FIG. 5, it can be seen that a heartbeat signal is periodically transmitted at each of times ta, tb, tc, td, and te. Each of the periods between times ta and tb, between times tb and tc, between times tc and td, and between times td and te is a heartbeat cycle and correspond to the predetermined period.

At time ta, timer 108 times out, a heartbeat signal is transmitted, and timer 108 is reset. No anomaly has been detected during a predetermined period (not illustrated) until the transmission of the heartbeat signal at time ta, and the type of the anomaly is not contained in the heartbeat signal transmitted at time ta, as indicated by "None" in FIG. 5.

At time t1, type determiner 103 detects an anomaly and determines the type of the anomaly as type A. It is assumed that no anomaly has been detected before time t1 and that the type of the anomaly detected last time is not held in temporary holder 104 for change determination. In this case, type change determiner 105 determines that there is a change between the type of the anomaly detected last time and the type of the anomaly detected this time. Anomaly detection log transmitter 107 transmits an anomaly detection log due to the determination that there is a change between the type of the anomaly detected last time and the type of the anomaly detected this time. Here, an anomaly detection log related to the anomaly of type A is transmitted. By receiving the anomaly detection log at time t1, attack determination device 20 having received the anomaly detection log can determine that an attack started at time t1 because no anomaly had been detected before time t1.

At time t2, type determiner 103 detects an anomaly and determines the type of the anomaly as type A. Since the type of the anomaly detected last time is type A, type change determiner 105 determines that there is no change between the type of the anomaly detected last time and the type of the anomaly detected this time. Anomaly detection log transmitter 107 does not transmit an anomaly detection log due to the determination that there is no change between the type of the anomaly detected last time and the type of the anomaly detected this time.

At time t3, type determiner 103 detects an anomaly and determines the type of the anomaly as type B. Since the type of the anomaly detected last time is type A, type change determiner 105 determines that there is a change between the type of the anomaly detected last time and the type of the anomaly detected this time. Anomaly detection log transmitter 107 transmits an anomaly detection log due to the determination that there is a change between the type of the anomaly detected last time and the type of the anomaly detected this time. Here, an anomaly detection log related to the anomaly of type B is transmitted.

At time tb, timer 108 times out, a heartbeat signal is transmitted, and timer 108 is reset. The anomalies of types A and B have been detected during a predetermined period (between times ta and tb) until the transmission of the heartbeat signal at time tb, and types A and B of the anomalies are contained in the heartbeat signal transmitted at time tb. Attack determination device 20 having received the heartbeat signal can recognize that the anomalies of types A and B have been detected between times ta and tb.

At time t4, type determiner 103 detects an anomaly and determines the type of the anomaly as type B. Since the type of the anomaly detected last time is type B, type change determiner 105 determines that there is no change between the type of the anomaly detected last time and the type of the anomaly detected this time. Anomaly detection log transmitter 107 does not transmit an anomaly detection log due to the determination that there is no change between the type of the anomaly detected last time and the type of the anomaly detected this time.

At time t5, type determiner 103 detects an anomaly and determines the type of the anomaly as type C. Since the type of the anomaly detected last time is type B, type change determiner 105 determines that there is a change between the type of the anomaly detected last time and the type of the anomaly detected this time. Anomaly detection log transmitter 107 transmits an anomaly detection log due to the determination that there is a change between the type of the anomaly detected last time and the type of the anomaly detected this time. Here, an anomaly detection log related to the anomaly of type C is transmitted.

At time t6, type determiner 103 detects no anomaly. In this case, type change determiner 105 determines that there is no change between the type of the anomaly detected last time and the type of the anomaly detected this time. Anomaly detection log transmitter 107 does not transmit an anomaly detection log due to the determination that there is no change between the type of the anomaly detected last time and the type of the anomaly detected this time.

At time tc, timer 108 times out, a heartbeat signal is transmitted, and timer 108 is reset. The anomalies of types B and C have been detected during a predetermined period (between times tb and tc) until the transmission of the heartbeat signal at time tc, and types B and C of the anomalies are contained in the heartbeat signal transmitted at time tc. Attack determination device 20 having received the heartbeat signal can recognize that the anomalies of types B and C have been detected between times tb and tc.

At time t7, type determiner 103 detects an anomaly and determines the type of the anomaly as type C. The type of the anomaly detected last time is type C of the anomaly detected at time t5, type change determiner 105 determines that there is no change between the type of the anomaly detected last time and the type of the anomaly detected this time. Anomaly detection log transmitter 107 does not transmit an anomaly detection log due to the determination that there is no change between the type of the anomaly detected last time and the type of the anomaly detected this time.

At times t8, t9, t10, t11, t12, and t13, type determiner 103 detects no anomaly. In this case, type change determiner 105 determines that there is no change between the type of the anomaly detected last time and the type of the anomaly detected this time. Anomaly detection log transmitter 107 does not transmit an anomaly detection log due to the determination that there is no change between the type of the anomaly detected last time and the type of the anomaly detected this time.

At time td, timer 108 times out, a heartbeat signal is transmitted, and timer 108 is reset. The anomaly of type C has been detected during a predetermined period (between times tc and td) until the transmission of the heartbeat signal at time td, and type C of the anomaly is contained in the heartbeat signal transmitted at time td. Attack determination device 20 having received the heartbeat signal can recognize that the anomaly of type C has been detected between times tc and td.

At time te, timer 108 times out, a heartbeat signal is transmitted, and timer 108 is reset. No anomaly has been detected during a predetermined period (between times td and te) until the transmission of the heartbeat signal at time te, and the type of the anomaly is not contained in the heartbeat signal transmitted at time te. Attack determination device 20 having received the heartbeat signal can recognize that no anomaly has been detected between time td and te, and can determine that the attack ended at time td (specifically, any one of times t7, t8, and t9).

[Another Example of Operation of Anomaly Detection Device]

Next, another example of the operation of anomaly detection device 10 will be described with reference to FIG. 6.

Figure 6:
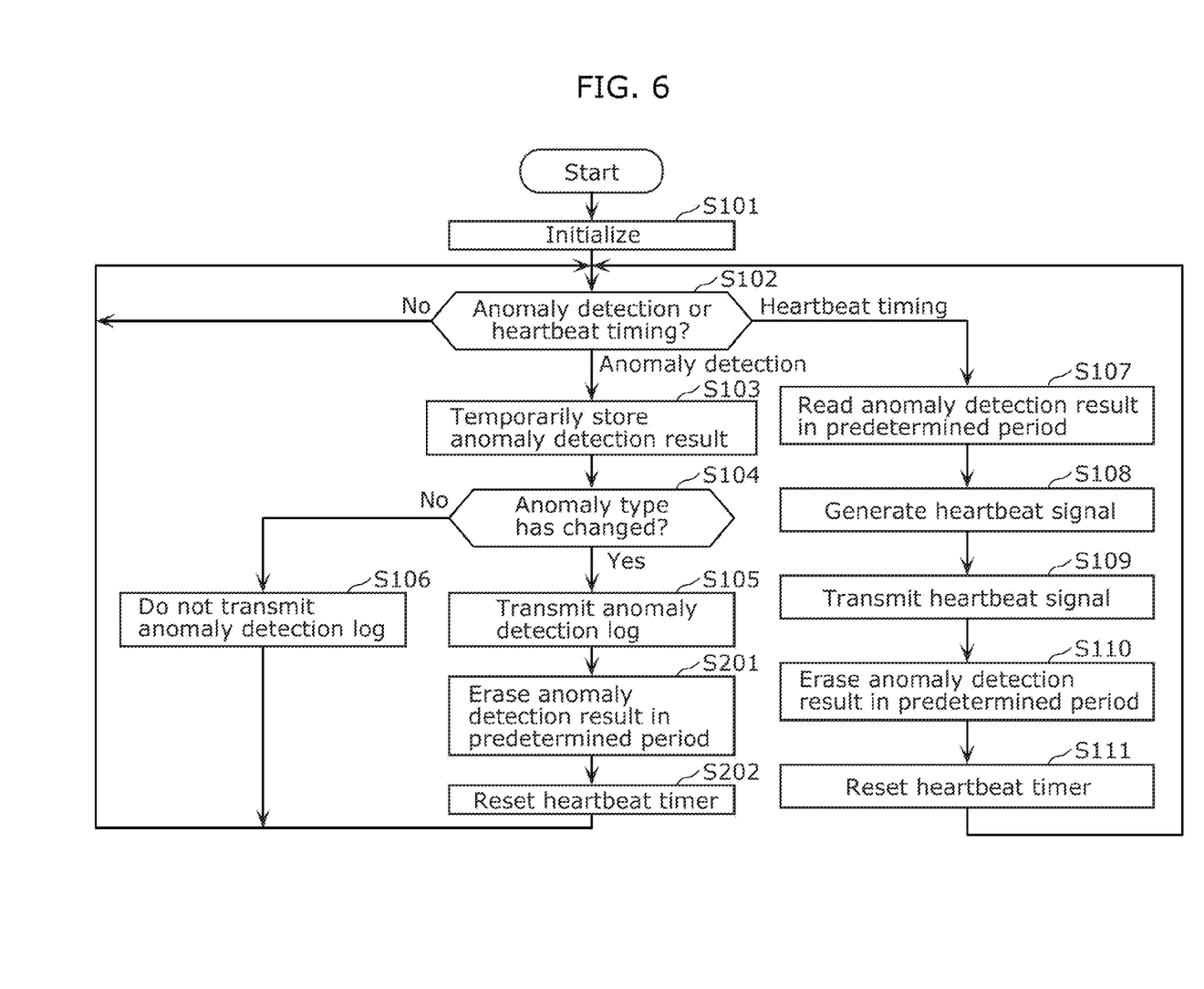
FIG. 6 is a flowchart illustrating another example of the operation of the anomaly detection device according to the embodiment.

FIG. 6 is a flowchart illustrating another example of the operation of anomaly detection device 10 according to the embodiment. Note that the same process as that described in FIG. 4 is denoted by the same reference numeral, and the description thereof will be omitted.

When an anomaly detection log is transmitted in step S105, anomaly detection device 10 erases the anomaly detection result in the predetermined period (step S201) and resets timer 108 configured to transmit the heartbeat signal (step S202). In the present example, the predetermined period is a period from the reset of timer 108 to the transmission of a heartbeat signal.

In the present example, timer 108 is reset when an anomaly detection log is transmitted and when a heartbeat signal is transmitted. Therefore, anomaly detection device 10 (heartbeat signal transmitter 111) transmits a heartbeat signal when an anomaly detection log has not been transmitted for a certain period of time after the reset of timer 108. In other words, when an anomaly detection log is transmitted before the lapse of a certain period of time after the reset of timer 108, anomaly detection device 10 does not transmit a heartbeat signal at the timing when a heartbeat signal should originally be transmitted. With no heartbeat signal being transmitted at the timing when a heartbeat signal should originally be transmitted, the anomaly detection result in the predetermined period also becomes unnecessary and is erased in step S201.

The transmission timing for anomaly detection logs and heartbeat signals in the present example will be specifically described with reference to FIG. 7.

Figure 7:
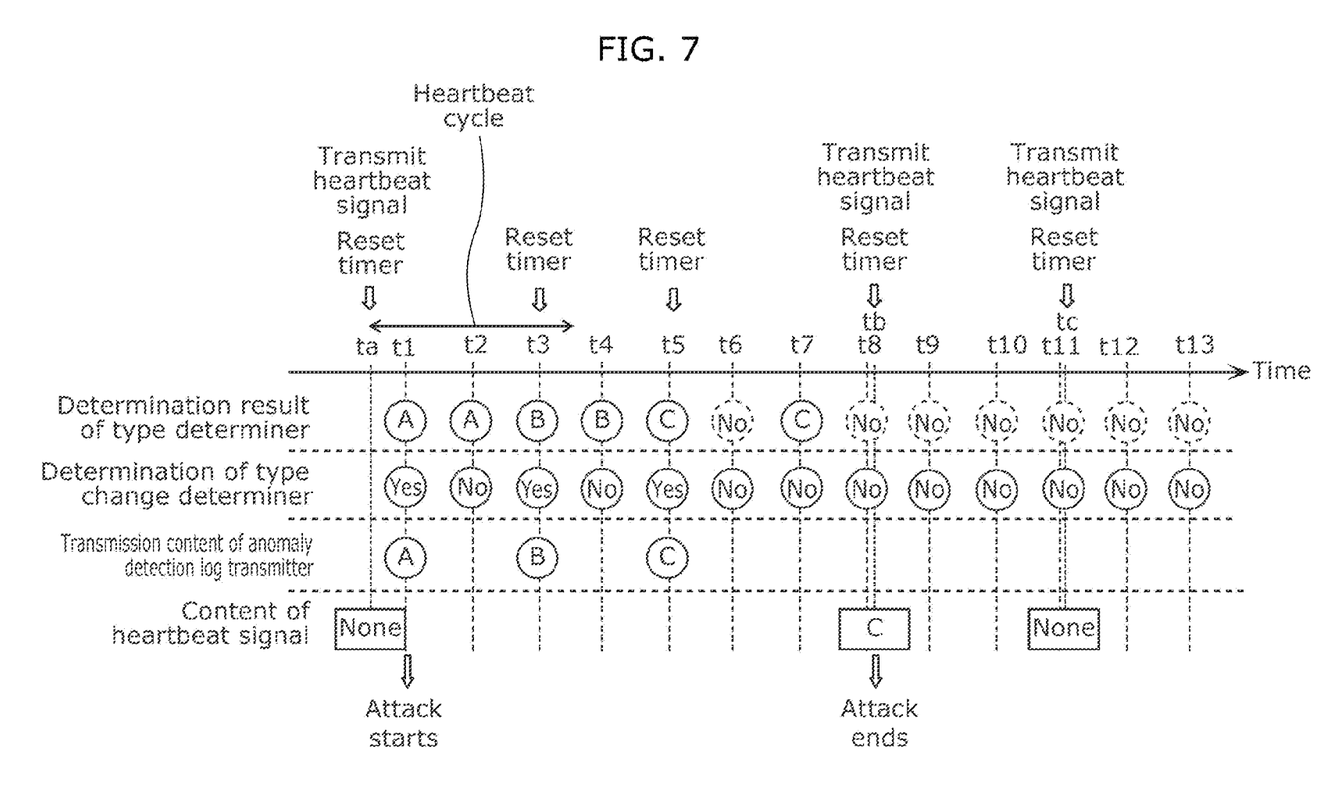
FIG. 7 is a timing chart illustrating another example of the transmission timing for anomaly detection logs and heartbeat signals according to the embodiment.

FIG. 7 is a timing chart illustrating another example of the transmission timing for anomaly detection logs and heartbeat signals according to the embodiment. Here, a description will be given of an example in which a heartbeat signal containing the type of an anomaly detected during a predetermined period is transmitted. The following description will focus on the differences from FIG. 5.

While FIG. 5 shows an example in which a heartbeat signal is transmitted every heartbeat cycle, it can be seen in FIG. 7 that a heartbeat signal is not transmitted periodically.

At time ta, timer 108 times out, a heartbeat signal is transmitted, and timer 108 is reset.

After the transmission of the heartbeat signal at time ta, an anomaly detection log is transmitted at time t3 before the lapse of a certain period of time (specifically, a heartbeat cycle). Timer 108 is thus reset at time t3. Therefore, a heartbeat signal is not transmitted at the timing when a heartbeat signal should originally be transmitted. For example, while a heartbeat signal is used for the device health monitoring of anomaly detection device 10, by transmitting an anomaly detection log, the anomaly detection log can be used for the device health monitoring instead of the heartbeat signal.

An anomaly detection log is transmitted at time t5 before the lapse of a certain period of time (heartbeat cycle) after the reset of timer 108 at time t3, and timer 108 is reset at time t5.

No anomaly detection log is transmitted for a certain period of time (heartbeat cycle) after the reset of timer 108 at time t5, and at time tb, timer 108 times out, a heartbeat signal is transmitted, and timer 108 is reset. The anomaly of type C has been detected during a predetermined period (between times t5 and tb) until the transmission of the heartbeat signal at time tb, and type C of the anomaly is contained in the heartbeat signal transmitted at time tb. Attack determination device 20 having received the heartbeat signal can recognize that the anomaly of type C has been detected between time t5 (that is, the timing at which the anomaly detection log related to the anomaly of the previous type C was transmitted) and tb.

At time tc, timer 108 times out, a heartbeat signal is transmitted, and timer 108 is reset. No anomaly has been detected during a predetermined period (between times tb and tc) until the transmission of the heartbeat signal at time tc, and the type of the anomaly is not contained in the heartbeat signal transmitted at time tc. Attack determination device 20 having received the heartbeat signal can recognize that no anomaly has been detected between times tb and tc and can determine that the attack ended at time tb (specifically, any one of times t6, t7, and t8).

SUMMARY

Anomaly detection device 10 is a device for detecting an anomaly in a mobile body (for example, an automobile) and includes: type determiner 103 that determines a type of an anomaly detected; type change determiner 105 that determines whether or not a change has occurred between a type of an anomaly detected last time and a type of an anomaly detected this time; and anomaly detection log transmitter 107 that transmits an anomaly detection log related to the anomaly detected this time when the change has occurred, and does not transmit the anomaly detection log related to the anomaly detected this time when the change has not occurred.

With this configuration, not all the anomaly detection logs related to the detected anomalies are transmitted, but only when there is a change between the type of the anomaly detected last time and the type of the anomaly detected this time, the anomaly detection log related to the anomaly detected this time is transmitted, and hence the amount of communication data can be reduced. Note that the state of anomaly detection (specifically, what type of anomaly was detected during what period) can be reproduced from the anomaly detection log when there is a change in the type of the anomaly. Due to the reduction in the amount of communication data for the anomaly detection log, it is possible to reduce the storage capacity for storing anomaly detection logs transmitted from anomaly detection device 10 (for example, the storage capacity of attack determination device 20).

For example, anomaly detection device 10 may further include heartbeat signal transmitter 111 that periodically transmits a heartbeat signal, and temporary holder 109 for heartbeat signals that holds an anomaly detection result including information indicating the detection of an anomaly during a predetermined period until the transmission of a heartbeat signal. When an anomaly is detected during the predetermined period, heartbeat signal transmitter 111 may transmit a heartbeat signal containing information that indicates the detection of the anomaly and that is included in the anomaly detection result held in temporary holder 109 for heartbeat signals.

When there is no change in the type of the anomaly from the last transmission of the anomaly detection log, no further anomaly detection log is transmitted, and hence it is difficult to determine whether an attack that caused the anomaly has ended or is continuing. In contrast, when an anomaly is detected during a predetermined period until the transmission of a heartbeat signal, a heartbeat signal that contains information indicating the detection of the anomaly during the predetermined period is transmitted. Therefore, when the transmitted heartbeat signal contains information indicating the detection of the anomaly, it can be determined that the attack is continuing, and when the transmitted heartbeat signal does not contain information indicating the detection of the anomaly, it can be determined that the attack has ended.

For example, anomaly detection device 10 may further include heartbeat signal transmitter 111 that periodically transmits a heartbeat signal, and temporary holder 109 for heartbeat signals that holds an anomaly detection result including the type of an anomaly detected during a predetermined period until the transmission of a heartbeat signal. When an anomaly is detected during the predetermined period, heartbeat signal transmitter 111 may transmit a heartbeat signal containing the type of the anomaly included in the anomaly detection result held in temporary holder 109 for heartbeat signals.

When there is no change in the type of the anomaly from the last transmission of the anomaly detection log, no further anomaly detection log is transmitted, and hence it is difficult to determine whether an attack that caused the anomaly has ended or is continuing. In contrast, when an anomaly is detected during a predetermined period until the transmission of a heartbeat signal, a heartbeat signal containing the type of the anomaly detected during the predetermined period is transmitted. Therefore, when the transmitted heartbeat signal contains the type of the anomaly, it can be determined that the attack is continuing, and when the transmitted heartbeat signal does not contain the type of the anomaly, it can be determined that the attack has ended. Further, with the type of an anomaly being contained in a heartbeat signal transmitted periodically, it is also possible to recognize what type of anomaly occurred at each timing when the heartbeat signal is transmitted.

For example, the anomaly detection result held in temporary holder 109 for heartbeat signals may be erased at the time of transmission of a heartbeat signal.

The anomaly detection result in a predetermined period until the transmission of a heartbeat signal, which is held in temporary holder 109 for heartbeat signals, becomes unnecessary when the heartbeat signal is transmitted. Therefore, the unnecessary anomaly detection result can be deleted from temporary holder 109 for heartbeat signals, and the anomaly detection result in a predetermined period until the transmission of the next heartbeat signal can be held in temporary holder 109 for heartbeat signals.

For example, the predetermined period may be a period from the transmission of the heartbeat signal last time to the transmission of the heartbeat signal this time.

This makes it possible to transmit a heartbeat signal containing information that indicates the detection of an anomaly in the immediately preceding heartbeat cycle or containing the type of an anomaly in the immediately preceding heartbeat cycle.

For example, anomaly detection device 10 may further include timer 108 that is reset when an anomaly detection log is transmitted and when a heartbeat signal is transmitted. Heartbeat signal transmitter 111 may transmit a heartbeat signal when an anomaly detection log has not been transmitted for a certain period of time after the reset of timer 108.

While a heartbeat signal is used for device health monitoring of anomaly detection device 10, an anomaly detection log may be used instead of a heartbeat signal. Therefore, timer 108 for transmitting a heartbeat signal is reset, also, when an anomaly detection log is transmitted. Thus, when an anomaly detection log is transmitted before the lapse of a certain period of time after the reset of timer 108, even if a heartbeat signal is not transmitted, anomaly detection device 10 can perform the device health monitoring using the anomaly detection log. Hence the number of times a heartbeat signal is transmitted can be reduced, further reducing the amount of communication data.

For example, at the time of transmission of an anomaly detection log, the anomaly detection result held in temporary holder 109 for heartbeat signals may be deleted.

When an anomaly detection log is transmitted, timer 108 for transmitting the heartbeat signal is reset, and the anomaly detection result in a predetermined period until the transmission of a heartbeat signal, which is held in temporary holder 109 for heartbeat signals, becomes unnecessary. Therefore, the unnecessary anomaly detection result can be deleted from temporary holder 109 for heartbeat signals, and the anomaly detection result in a predetermined period until the transmission of the next heartbeat signal can be held in temporary holder 109 for heartbeat signals.

For example, the predetermined period may be a period from the reset of timer 108 to the transmission of a heartbeat signal.

It is thereby possible to transmit a heartbeat signal containing information that indicates the detection of an anomaly in a period from the reset of timer 108 to the transmission of a heartbeat signal, or containing the type of an anomaly in the period.

Other Embodiments

The embodiment has been described as above as an example of the technique according to the present disclosure. However, the technique according to the present disclosure is not limited thereto but is applicable to an embodiment where a change, substitution, addition, omission, or the like has been made as appropriate. For example, the following variations are also included in one embodiment of the present disclosure.

For example, in the above embodiment, an example has been described where anomaly detection device 10 includes components for transmitting a heartbeat signal, such as heartbeat signal transmitter 111 and temporary holder 109 for heartbeat signals, but anomaly detection device 10 may not include components for transmitting a heartbeat signal.

For example, in the above embodiment, security measures in an automobile (for example, an in-vehicle network mounted on an automobile) as a mobile body have been described, but the scope of application of the present disclosure is not limited to automobiles. For example, the present disclosure may be applied not only to automobiles but also such vehicles for mobility as construction machinery, agricultural machinery, ships, railways, and airplanes.

Note that the present disclosure can be achieved not only as anomaly detection device 10 but also as an anomaly detection method including steps (processes) performed by the respective components constituting anomaly detection device 10.

Figure 8:
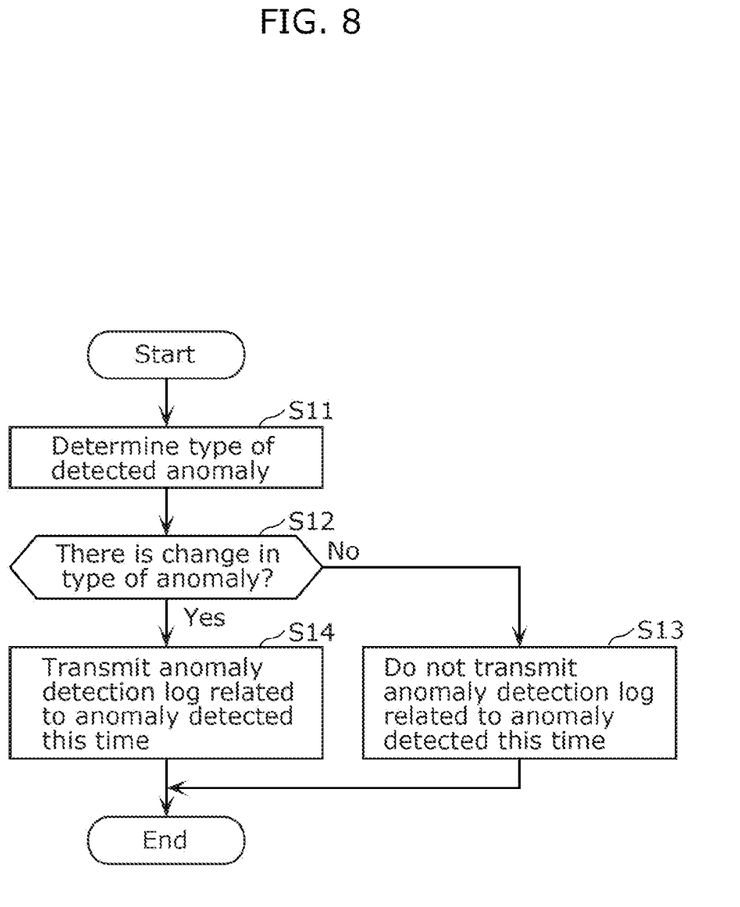
FIG. 8 is a flowchart illustrating an example of an anomaly detection method according to another embodiment.

FIG. 8 is a flowchart illustrating an example of an anomaly detection method according to another embodiment.

As illustrated in FIG. 8, the anomaly detection method is a method for detecting an anomaly in a mobile body and includes: determining a type of an anomaly detected (step S11); determining whether or not a change has occurred between a type of an anomaly detected last time and a type of an anomaly detected this time (step S12); and transmitting an anomaly detection log related to the anomaly detected this time (step S14) when the change has occurred (Yes in step S12), and not transmitting the anomaly detection log related to the anomaly detected this time (step S13) when the change has not occurred (No in step S12).

For example, the steps in the anomaly detection method may be executed by a computer (a computer system). The present disclosure can be achieved as a program for causing the computer to execute the steps included in the anomaly detection method.

Further, the present disclosure can be achieved as a non-transitory computer-readable recording medium, such as a compact disc read-only memory (CD-ROM), having the program recorded thereon.

For example, when the present disclosure is achieved by a program (software), each step is executed by executing the program using hardware resources such as the central processing unit (CPU), the memory, and the input-output circuit of the computer. That is, each step is executed by the CPU obtaining data from the memory, the input-output circuit, or the like to perform calculation or outputting the calculation result to the memory, the input-output circuit, or the like.

Each component included in anomaly detection device 10 of the above embodiment may be achieved as a dedicated or general-purpose circuit.

Each component included in anomaly detection device 10 of the above embodiment may be achieved as a large-scale integration (LSI) circuit that is an integrated circuit (IC).

Further, the integrated circuit is not limited to an LSI circuit but may be achieved by a dedicated circuit or a general-purpose processor. A field programmable gate array (FPGA) that can be programmed, or a reconfigurable processor in which the connections and settings of circuit cells inside an LSI circuit are reconfigurable, may be used.

Moreover, if an integrated circuit technology that replaces LSI appears due to the advance of the semiconductor technology or another derived technology, each component included in anomaly detection device 10 may naturally be integrated using the technology.

In addition, the present disclosure also includes forms obtained by applying various variations conceivable by a person skilled in the art to the embodiments, and forms achieved by arbitrarily combining the components and functions of the embodiments within the scope not departing from the spirit of the present disclosure.

FURTHER INFORMATION ABOUT TECHNICAL BACKGROUND TO THIS APPLICATION

The disclosures of the following patent applications including specification, drawings, and claims are incorporated herein by reference in their entirety: PCT International Application No. PCT/JP2021/027124 filed on Jul. 20, 2021, designating the United States of America, which is based on and claims priority of Japanese Patent Application No. 2020-177337 filed on Oct. 22, 2020.

INDUSTRIAL APPLICABILITY

The present disclosure is applicable to a device for detecting an anomaly in, for example, an in-vehicle network or the like mounted on an automobile.

The invention claimed is:

1. An anomaly detection device for detecting an anomaly in a mobile body, the anomaly detection device comprising:
   a type determiner that determines a type of an anomaly detected this time;
   a type change determiner that determines whether a change has occurred between a type of an anomaly detected last time and the type of the anomaly detected this time;
   an anomaly detection log transmitter that transmits an anomaly detection log related to the anomaly detected this time when the change has occurred, and does not transmit the anomaly detection log related to the anomaly detected this time when the change has not occurred;

a heartbeat signal transmitter that periodically transmits a heartbeat signal; and a holder that holds an anomaly detection result including information indicating detection of an anomaly during a predetermined period until the heartbeat signal is transmitted, wherein when the anomaly is detected during the predetermined period, the heartbeat signal transmitter transmits the heartbeat signal containing the information that indicates the detection of the anomaly and that is included in the anomaly detection result held in the holder.

2. An anomaly detection device for detecting an anomaly in a mobile body, the anomaly detection device comprising:

a type determiner that determines a type of an anomaly detected this time;

a type change determiner that determines whether a change has occurred between a type of an anomaly detected last time and the type of the anomaly detected this time;

an anomaly detection log transmitter that transmits an anomaly detection log related to the anomaly detected this time when the change has occurred, and does not transmit the anomaly detection log related to the anomaly detected this time when the change has not occurred;

a heartbeat signal transmitter that periodically transmits a heartbeat signal; and a holder that holds an anomaly detection result including a type of an anomaly detected during a predetermined period until the heartbeat signal is transmitted, wherein when the anomaly is detected during the predetermined period, the heartbeat signal transmitter transmits the heartbeat signal that contains the type of the anomaly included in the anomaly detection result held in the holder.

3. The anomaly detection device according to claim 1, wherein the anomaly detection result held in the holder is erased at a time when the heartbeat signal is transmitted.

4. The anomaly detection device according to claim 1, wherein the predetermined period is a period from transmission of the heartbeat signal last time to transmission of the heartbeat signal this time.

5. The anomaly detection device according to claim 1, further comprising a timer that is reset when the anomaly detection log is transmitted and when the heartbeat signal is transmitted, wherein the heartbeat signal transmitter transmits the heartbeat signal when the anomaly detection log has not been transmitted for a certain period of time after the reset of the timer.

6. The anomaly detection device according to claim 5, wherein the anomaly detection result held in the holder is erased at a time when the anomaly detection log is transmitted.

7. The anomaly detection device according to claim 5, wherein the predetermined period is from the reset of the timer to transmission of the heartbeat signal.

8. An anomaly detection method for detecting an anomaly in a mobile body, the anomaly detection method comprising:

determining a type of an anomaly detected this time;

determining whether a change has occurred between a type of an anomaly detected last time and the type of the anomaly detected this time;

transmitting an anomaly detection log related to the anomaly detected this time when the change has occurred, and not transmitting the anomaly detection log related to the anomaly detected this time when the change has not occurred;

periodically transmitting a heartbeat signal; and holding an anomaly detection result including information indicating detection of an anomaly during a predetermined period until the heartbeat signal is transmitted, wherein, when the anomaly is detected during the predetermined period, the heartbeat signal containing the information that indicates the detection of the anomaly and that is included in the anomaly detection result is transmitted.

* * * * *